United States Patent
Brooks

[11] 3,897,682
[45] Aug. 5, 1975

[54] CYSTOMETER SYSTEM AND PRESSURE TRANSDUCER

[75] Inventor: Albert E. Brooks, Montecito, Calif.

[73] Assignee: Heyer-Schulte Corporation, Goleta, Calif.

[22] Filed: Nov. 15, 1973

[21] Appl. No.: 415,966

[52] U.S. Cl.................. 73/149; 73/398 R; 73/406; 128/2 S
[51] Int. Cl....................... G01f 17/00; A61b 5/10
[58] Field of Search........... 73/149, 37, 223, 194 R, 73/398 R, 406, 407; 128/2 S, 2 R; 222/335; 350/96 B; 92/98 R

[56] References Cited
UNITED STATES PATENTS

| | | | |
|---|---|---|---|
| 1,712,848 | 5/1929 | Rose | 128/2 R |
| 3,100,997 | 8/1963 | Lorenz | 73/406 |
| 3,367,244 | 2/1968 | Charter | 92/98 R |
| 3,453,881 | 7/1969 | Keng | 73/149 |
| 3,491,920 | 1/1970 | Racki et al. | 222/335 |
| 3,674,010 | 7/1972 | Falenks | 128/2 R |
| 3,686,958 | 8/1972 | Porter et al. | 73/398 R |

OTHER PUBLICATIONS

Reynolds, F. Neon *Testing Patency of Fallopian Tubes*, in British Medical Journal, p. 1034, June 9, 1934.

*Primary Examiner*—Richard C. Queisser
*Assistant Examiner*—Marcus S. Rasco
*Attorney, Agent, or Firm*—Donald D. Mon

[57] ABSTRACT

A cystometer system for insufflating a gas into the human body. The system includes a reservoir, such as a piston-cylinder combination, the piston forming a movable wall whose movement changes the volume of the chamber. Biasing means exerts force on the piston, tending to diminish the volume of the chamber in opposition to fluid pressure therein. A supply conduit opens into the chamber on the side of the movable wall to which application of gas under pressure tends to enlarge the chamber. A pressure relief valve is in fluid communication with the chamber and discharges to atmosphere so as to limit the maximum fluid pressure which can be imposed in the chamber. A first selector valve has first, second and third ports. A supply conduit is connected to the first port. A charging conduit is connected to the second port, and an outfeed conduit is connected to the third port. The first selector valve selectively interconnects the first port to the second port or to the third port, but cannot directly connect the second and third ports. Flow control means can be incorporated in the outfeed conduit by means of which the rate of flow therethrough is selectible, adjustable, or both. A pressure sensor useful in this system for providing a readout of the pressure in the outfeed conduit comprises a body with a cavity and a flexible elastic diaphragm extending across and closing the cavity. The diaphragm has a movable portion carrying an occlusion means with an opaque portion which can interrupt the transmission of light. A fiber optic light source and a fiber optic light receiver each comprises a bundle of light-transmissive fibers. The source and receiver are aligned with one another, and the occlusion means is so disposed and arranged that movement of the diaphragm in response to differences in pressure in the cavity will cause the occlusion means to move across the light path between them and thereby vary the light transmitted to a light-sensitive sensor, which sensor produces a signal proportional to the light received by the light receiver.

19 Claims, 12 Drawing Figures

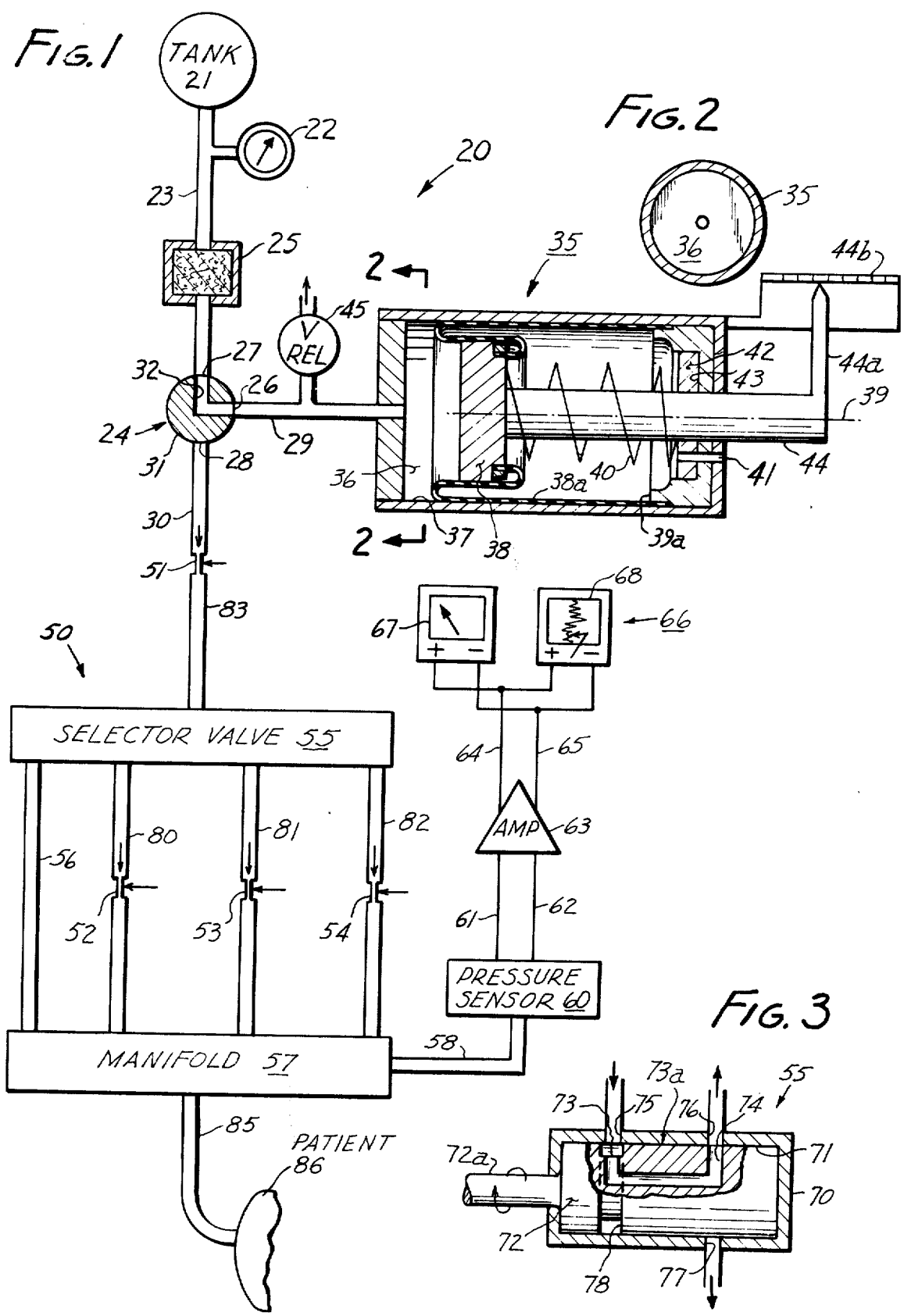

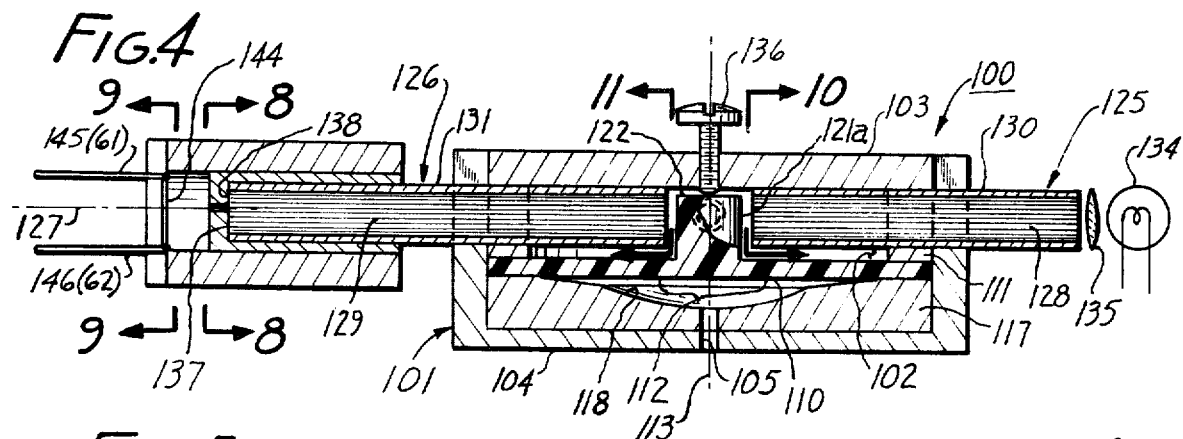
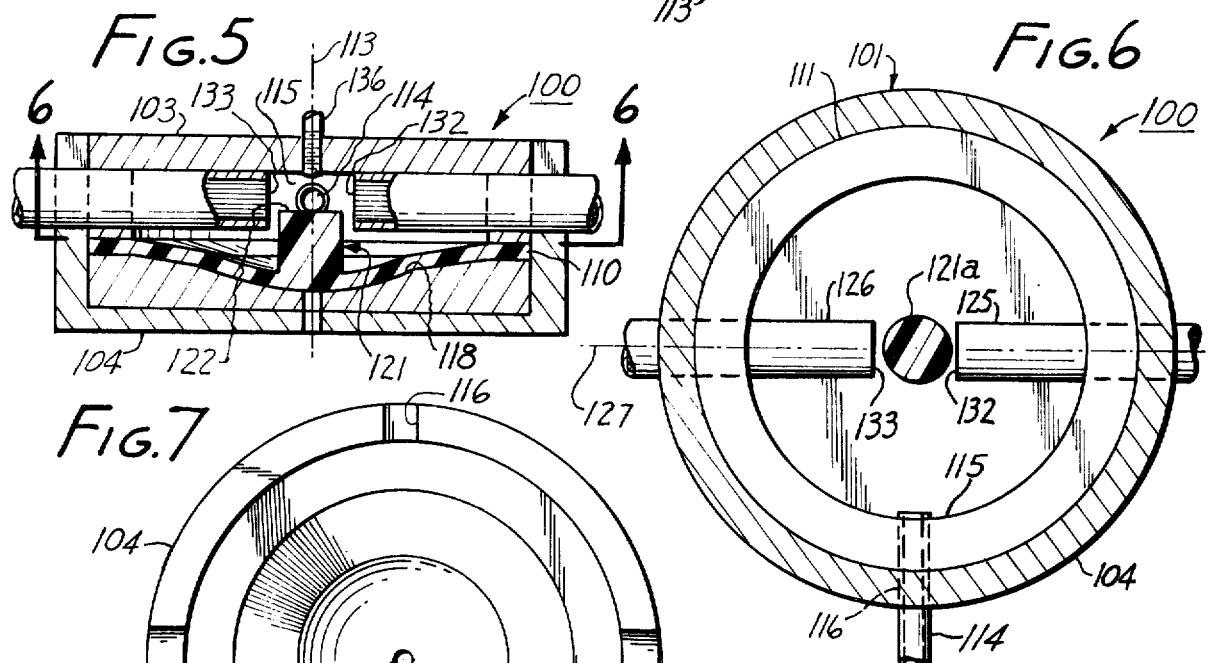
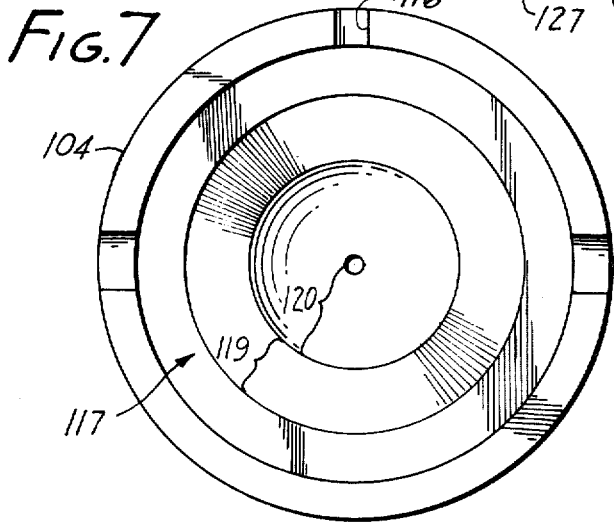
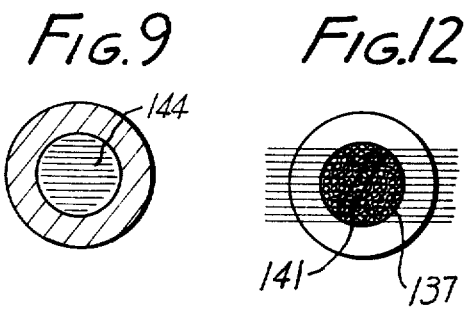
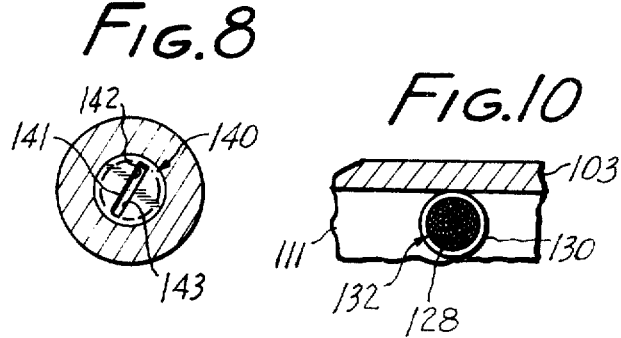

3,897,682

CYSTOMETER SYSTEM AND PRESSURE TRANSDUCER

This invention relates to cystometers and to a transducer useful in low pressure systems. It finds especial utility in measurement of bladder and cranial pressures.

Cystometers are utilized for insufflating gases into the human body, particularly through the urethra into the lower urinary tract. Physicians are able to test the volumetric capacity of the bladder by the insufflation of gas into it. Also, they are able to test the elasticity or muscle tone of the bladder by measuring pressures which can be developed by muscular exertion on the insufflated gas. The insufflation of gas for this purpose can, unless closely regulated, be dangerous to the patient. For example, excessive gas pressure can rupture a urethra or bladder. Because the gases are initially supplied by pressure sources maintained at pressures which are unacceptable to the human body, it is necessary to isolate that part of the system which is connected to the human body from any possibility of direct transmission of the relatively higher pressure gases. The cystometer system of this invention enables medical grade carbon dioxide to be provided to the system from cartridges at relatively high pressures, and to be supplied to the human body from a chamber of variable volume whose pressure is inherently self-limited. Accordingly, no excessive pressure can be developed to damage the body.

In insufflation techniques, it is useful to be able to introduce gas into the human system at rates which are selectible, adjustable, or both. For example, if a person has a relatively inelastic bladder which can receive only a relatively small amount of gas, the insufflation of the gas at a high rate may cause intense pain. For this reason, the flow rate initially should be conservatively low. After the initial response is observed, then it may be introduced at a higher rate.

The maximum pressure used in this system is relatively low, the maximum permissible pressure for many physiological systems being on the order of 150 cm of water. Commonly known pressure sensors have proved to be inadequate for providing signals which are directly proportional to these relatively low pressures. Accordingly, this invention includes a unique pressure sensor which is especially useful in a cystometer system, although it may, of course, find utility in other applications, such as the measurement of intracranial pressures.

A cystometer according to this invention comprises a reservoir with a chamber having a movable wall whose position, at least in part, determines the volume of the chamber, the movement of the movable wall changing the volume. Biasing means exerts force on the wall, tending to diminish the volume in opposition to fluid pressure in the chamber. A first selector valve has a first, second and third port respectively connected to a supply conduit to the chamber, to a charging conduit adapted to receive gas under pressure, and to an outfeed conduit to the patient. The selector valve selectively interconnects the first port to the second port or to the third port, but does not permit interconnection of the second and third ports.

According to a preferred but optional feature of the invention, flow control means is introduced in the outfeed conduit, whereby the rate of flow of gas from the chamber is selectible or adjustable, or both.

According to another preferred but optional feature of the invention, indicator means indicates the volume of gas insufflated into the patient.

A pressure sensor according to the invention comprises a body with a cavity and a flexible elastic diaphragm extending across and closing the cavity. The diaphragm has a movable portion which is movable along an axis of movement and carries an opaque occlusion means adapted variably to occlude the light path between a fiber optic light source and a fiber optic light receiver. The amount of occlusion is a function of the pressure in the cavity.

The above and other features of the invention will be fully understood from the following detailed description and the accompanying drawings in which:

FIG. 1 is a system drawing, principally in schematic notation, showing the cystometer system of the invention;

FIG. 2 is a cross-section taken at line 2—2 of FIG. 1;

FIG. 3 is a fragmentary axial view of a portion of FIG. 1;

FIG. 4 is an axial cross-section of pressure sensor used in FIG. 1;

FIG. 5 is a fragment of FIG. 4 in another operating position;

FIG. 6 is a cross-section taken at line 6—6 of FIG. 5;

FIG. 7 is a plan view of a portion of FIG. 4;

FIGS. 8, 9, 10 and 11 are cross-sections taken at lines 8—8, 9—9, 10—10 and 11—11, respectively, in FIG. 4; and 9—

FIG. 12 is a schematic notation illustrating the function of a portion of FIG. 8.

FIG. 1 illustrates a cystometer system 20 according to the invention. A tank 21 is shown schematically as a source of gas, such as medical grade carbon dioxide, for the system. This tank is sometimes referred to as a supply of gas for insufflation and may conveniently be a common metal puncturable cartridge. The pressures in these cartridges are, at least when they are full, too high for direct insufflation.

A supply gauge 22 is teed off a charging conduit 23 that is interconnected between the tank and the first selector valve 24. This gauge shows cartridge (tank) pressure. A filter 25 in the charging conduit cleans the gas passed therethrough.

The first selector valve has first, second and third ports 26, 27, 28, respectively. First port 26 is connected to a supply conduit 29, second port 27 is connected to charging conduit 23, and third port 28 is connected to an outfeed conduit 30. A rotary selector 31 includes a central passage 32 which opens onto the wall of the selector so as selectively to interconnect the first port with either the second port 27 or with the third port 28. It is impossible for the central passage 32 to interconnect the second and third ports. Therefore, the outfeed conduit is always entirely isolated from the charging conduit. The selector has an intermediate position where no ports are interconnected, and the valve then is "off." The selector passes through this position in moving from its two selector positions, and this assures the isolation of the second and third ports from each other.

A reservoir 35 is connected to first port 26 of the first selector valve by the supply conduit 29. The reservoir includes a chamber 36 which has a variable volume. The chamber is at least partially defined by a cylinder 37 and a piston 38. A rolling bellows 38a makes a fluid seal between the cylinder and the piston, and enables the piston to move axially in the cylinder to change the volume of the chamber. The piston constitutes a "movable wall" whose position along axis 39 determines the volume of chamber 36.

A stop member 39a fits in one end of the reservoir. The piston can abut it when the chamber is at its largest volume, and this establishes the largest volume. Changing the axial length of the stop member changes the largest volume.

Biasing means 40 comprises a coil spring interposed between the structure of the reservoir (i.e., the stop member 39a) and the piston, tending to move the movable wall in such a direction (to the left in FIG. 1) to diminish said volume in opposition to fluid pressure in chamber 36 which tends to move it to the right. A vent 41 is formed behind the piston.

To provide a convenient means for adjustment of spring force, a filler block 42, shaped like a washer, is placed in a seat 43 in the stop. The coil spring bears against it, and by changing the axial length (thickness) of this block, one can adjust the compressive force in the spring. Thickening the block raises the force. The seat is deep enough to accommodate all of the spring when the piston is moved against the stop.

A guide shaft 44 is attached to the piston and projects from the cylinder. It carries a pointer 44a which is referenced to a fixed scale 44b The pointer moves with the piston. Together with the scale, it provides measuring means for measuring the amount of gas insufflated into the patient.

A pressure relief valve 45 is in fluid connection with chamber 36. This is most conveniently accomplished by teeing it into supply conduit 29. The relief valve is adjustably settable to a preselected maximum pressure. This valve will prevent pressure from rising in the chamber above the level at which the relief valve is set to open. Therefore, regardless of the value of the pressure present in the tank, pressure in the chamber will never exceed that permitted by the relief valve. Excessive pressure can, therefore, never be present in the chamber or reach the patient. Even if a careless attendant leaves the first selector valve in the setting of FIG. 1 for a time longer than is needed to fill the chamber, the result will only be a chamber filled to the correct pressure, excess gas having been bled off through the pressure relief valve.

The outfeed conduit has incorporated in it flow control means 50. In the preferred embodiment, the control means comprises four adjustable orifices 51, 52, 53, 54 which can be arranged to have decreasing flow section areas in that order, i.e., the flow section of orifice 51 is the greatest, and that of orifice 54 is the least. These may conveniently be provided as needle valves. This type of valve is adjustable, and the system provides for selectibility among these valves. Should only selectibility be desired, then the orifices may be fixed and not adjustable.

Orifice 51 is directly incorporated in the upper leg 83 of the outfeed conduit (FIG. 1) upstream of a second selector valve 55. The second selector valve has the capacity to select between an unimpeded conduit 56 and conduits which include respective ones of orifices 52, 53 and 54. These conduits all unite and discharge into a manifold 57 which is defined as another portion of the outfeed conduit. The outfeed conduit therefore incorporates upper leg 83, the second selector valve, the orifices, and the manifold. Alternatively, orifice 51 could have been included in conduit 56.

The manifold, and therefore the outfeed conduit, is tapped by a sensor conduit 58 which conducts manifold (outfeed conduit) pressure to a pressure sensor 60. The pressure sensor is a type which is responsive to pressure, and which generates an electrical signal proportional to the pressure in the manifold. The signal is conducted through circuitry 61, 62 to an amplifier 63 which amplifies the signal and conducts it by circuitry 64, 65 to a readout means 66 which is shown in two forms, namely a readout meter 67 and a pen-recorder 68 which may be concurrently or alternately used as desired. The recorder records pressure plotted on an elapsed time base.

FIG. 3 shows the second selector valve 55 in more physical detail. It includes a body 70 with a central circularly cylindrical wall 71 therein. A valve operator 72 has a stem 72a projecting through the body so that the operator can be rotated. The operator includes a peripheral cylindrical wall 73a which makes a shear-type fluid-sealing fit with wall 71. An inlet port 73 and an outlet port 74 are interconnected and open onto wall 73a. The body includes a first port 75 which is connected to the upper leg 83 of the outfeed conduit 30. Four other ports, only two of which are shown (ports 76 and 77) are disposed in the same plane, 90° apart, and are adapted to register with outlet port 74 on a selected basis so as individually to connect outlet port to a selected and respective one of the connectors 56 (the unimpeded conduit) 80, 81 and 82. Orifices 52, 53 and 54 are connected in connectors 80, 81 and 82, respectively. A ring groove 78 in the valve operator 72 arranges that inlet port 73 is always connected to the inlet port and, therefore, to upstream outfeed conduit pressure. Rotation of the valve operator is the means to determine which of the orifices will be connected in the outfeed conduit at a given time.

The second selector valve provides selectible means to vary the flow rate in the system. It is equally possible to provide a single selector valve with a single adjustable variable needle orifice to achieve both selectibility and adjustability, but in clinical practice, this is not as convenient as selectibility among standardized settings.

A pressure sensor 100, which may be used as pressure sensor 60, is shown in FIG. 1. Pressure sensor 100 has a body 101 with a cavity 102. The upper portion of the cavity is closed by a cap 103. A bottom portion is a cup-shaped base 104, the two portions telescoping relative to one another. A vent 105 is formed in the bottom of base 104.

A diaphragm 110 extends across and closes the cavity. It is a flat, circular disc, and is elastic and flexible. Preferably, it is made of an elastomer, the best known material for this purpose being silicone elastomer. It is rigidly attached at its peripheral edge by being clamped between the base (or between a backing member yet to be described, which is defined as part of the base) and a flange 111 on the cap. Because the diaphragm is flexible and elastic and free at its center, there is a central movable portion 112 which can move along an axis of movement 113 in response to a change of fluid pressure in cavity 102. The diaphragm is imperforate. With the cap, the diaphragm forms a completely enclosed cavity. There is a signal pressure inlet 114 (FIGS. 5 and 6) passing through the wall 115 of the cap 103 and through a notch 116 in the base. This signal pressure inlet is connected to the sensor conduit 58 in FIG. 1.

A shaping member 117 is formed inside base 104. While this member may be an integral part of the base, it is more conveniently formed as part of a disc-shaped backing member which fits in the base. In either event, it is defined as part of the base. The shaping member has an abutment surface 118 which is a surface of revolution generated around axis of movement 113. An advantage of using a removable and replaceable backing member is that abutment surfaces 118 of different shapes and dimensions can readily be substituted for one another. This is a useful feature when one attempts to match particular diaphragms and abutment surfaces to obtain a more linear pressure response.

The abutment surface extends away from the diaphragm as it extends away from the edge. In the preferred embodiment, it has two regions: an outer frustoconical region 119 (FIG. 7) and a domeshaped central region 120. It will be noted that, as the pressure increases in the cavity and the diaphragm stretches, it lays down on the abutment surface at different rates which can be selected by altering the shape of the regions of the abutment surface.

An occlusion means 121 is formed as an opaque post 121a, having an upper edge 122. This upper edge preferably lies perpendicular to axis 113 and is shifted along the axis as the pressure varies in the cavity. The edge could be shaped (for example, slanted) to provide a variable rate of occlusion, if desired. The post is rigidly attached to a movable portion of the diaphragm, such as by cementing.

A fiber optic light source 125 and a fiber optic light receiver 126 have a common optical axis 127 or light path, i.e., they are aligned with one another. The source and receiver are formed as bundles 128, 129 of individual parallel, small diameter, light-transmissive fibers in accordance with known fiber optic constructions. These bundles may conveniently be bound in metal tubes 130, 131, and at their ends are ground to form faces 132, 133, which lie normal to the optical axis 127. Therefore, light from the light source will be transmitted from face 132 to face 133 and to the bundle of fibers respective to face 133. The light may be emitted by a light source 134, such as an incandescent bulb focused by a lens 135. An adjustment screw 136 is threaded through the cap to limit the travel of the occlusion means in one direction, namely in its direction of upward movement in FIG. 4.

The outlet end 137 of light receiver 126 is ground to form a face 138 from which light is discharged. Opaque means 140 is placed adjacent to face 138 and includes an elongated light-transmissive region 141 skewed to axis 113. As best seen in FIGS. 8 and 12, this is a slot with parallel sides 142, 143, through which light will be transmitted to a sensor 144 that, in turn, generates an electrical signal transmitter to circuitry 145, 146 (61 and 62 in FIG. 1). Means 140 can be rotated to change the angular orientation of the slot relative to the axis of movement. This changes the quantum of light passed for any incremental axial movement of the occlusion means.

Axes 113 and 127 are normal to each other. They are nonparallel to one another.

The operation of the foregoing devices will now be described. When the system is first placed into operation, it will inherently be filled with air and should be purged by cycling it a few times while not connected to a patient. Cycling is accomplished by first putting carbon dioxide, or whatever gas is to be used, in tank 21. Gauge 22 will indicate the supply pressure, which will be relatively high.

When the first selector valve is connected as shown in FIG. 1, carbon dioxide will flow into the chamber, moving the piston to the right, and will therefore extend the chamber to its full volume, which may be selected as appropriate to the purpose of the system. The chamber will be full when the piston abuts the stop.

The scale and pointer will indicate the contents of the reservoir and provide means to read out the total volume of gas discharged as a function of movement of the piston.

Regardless of the pressure in tank 21, the pressure in the chamber cannot exceed the desired maximum system pressure, because the relief valve will discharge excess pressure. Therefore, should an operator be inattentive in the charging of this device, and leave the valve as shown in FIG. 1, it is possible for all of the gas in the tank to be discharged down to the pressure set by the relief valve. The amount required to fill the reservoir for one operation at the pressure limited by the pressure relief valve will remain in the chamber at the correct pressure.

When gas is to be discharged to the patient, the first selector valve is turned so as to connect ports 26 and 28. Before this time, the second selector valve will have been set, usually at the slowest rate. Should the slowest flow rate have been desired, then the selector valve will have been connected so as to pass the fluid from upper leg 83 through connector 82, and therefore orifices 51 and 54 will have been effective. Should a faster rate be desired, then flow will be directed through one of connectors 56, 80 or 81 instead, whereby a larger orifice, (or no orifice) will have been put in series with the first orifice, and a relatively higher rate of flow will transpire.

Doctors are able to determine, from a continuing observation of the pressure in the outfeed conduit, conditions within the urethra and the bladder, and these may be continuously read by means of the readout means. Should a permanent record be desired, then the recorder will have been used. If a permanent record is not necessary, only the meter will be used.

When the desired amount of gas has been discharged from the reservoir (usually limited by the tolerance of the patient to the pressure which builds upon his bladder), system operation either ceases if the total volume has been discharged, or if the first selector valve is turned "off." For purging the system, the chamber will be charged and discharged several times. A succeeding cycle can be started by positioning the first selector valve, as shown in FIG. 1, to recharge the reservoir.

When the system is to discharge into a patient, a catheter is connected to the lower leg 85 of the outfeed conduit and inserted in the patient 86 as appropriate. It will be noted that there is never the risk of an inadvertent excess pressure being present in the outfeed line. The use of carbon dioxide is useful because it is readily absorbed by the human body, which is not true of air.

The sensor of FIGS. 4–12 is particularly advantageous in the system of FIG. 1, because it can respond readily to the low pressures which are used. It has been found advantageous to use the interception of light between fiber optic bundles as derived from the controlled distortion of an elastic and flexible (preferably silicon elastomer) diaphragm to measure the pressure. Accordingly, when the pressure is to be measured, the light source 134 is illuminated, and the uppermost position of the occlusion means is selected by means of screw 136. A running adjustment of this may be made by turning the screw. Light region 141 may be rotated so that the slit interconnects different regions of the bundles to seek closer linearity of response. When pressure is exerted in the cavity, the diaphragm will be stretched and deflected progressively downwardly toward the ultimate position shown in FIG. 5. As the edge 122 moves down past sequential levels, shown as levels 160 in FIG. 12, progressively larger total numbers of fibers will be exposed to each other for the transmission of light, the fibers acting as little lenses to project and collect light rays across the gap between the faces. The quantum of light and the rate of change can be adjusted by turning the slit, and this provides a means of calibrating the device. Also, the rate of the device can be selected by arbitrary determination of the shape of the abutment surface, but, of course, this does not allow for running corrections.

The exposure of the various ends of the bundles of the fibers relative to one another is completely random, and this very randomness evens out the distribution of light across the receiving face as the occlusion means is pressed downwardly by increasing pressure. The result of this is a surprisingly proportional sensor at relatively low pressures.

The most useful diaphragm is made of medical grade silicone elastomer. Its durometer reading is basically a function of its heat cure. The pressure range and response of the diaphragm may be varied by changing its diameter, its thickness, and its durometer reading. Of these variables, the durometer reading is the most important, and is readily controlled.

A suitable diaphragm for use in the system shown, to readout pressures from zero to 150 cm of water, has a diameter of 1 ⅛ inches, a peripheral grip width of about ⅛ inch, leaving a free central disc-like portion with a diameter of about ⅞ inch. It is about 1 1/16 inches thick, and its durometer reading is about 40.

To summarize, this system has three safety means:
1. the first selector valve, which cannot connect the charging and outfeed conduits;
2. the relief valve, which prevents excessive pressures from reaching the patient; and
3. the control over the rate of flow exerted by the patient's bladder. The back pressure will increase as the volume of gas insufflated increases, and, of course, the amount of gas in is known from the scale. The patient will complain of excessive (for him) pressures. The rate control means also act to slow down the rate of insufflation, thereby to give plenty of reaction time for the operator.

The spring constants and spring loading are selected so that, even at the end of the piston stroke which corresponds to expulsion of all gas from the chamber, the biasing means exerts a force on the piston. Together with the orifice means, the biasing means provides for flow out of the chamber which, absent back pressures, is sensibly (although not absolutely) constant over most of the range of piston movement, and especially so in the first half to two-thirds thereof. A frequently used maximum capacity of chamber is 500 cc at a pressure of 150 cm of water.

This invention is not to be limited by the embodiments shown in the drawings and described in the description, which are given by way of example and not of limitation, but only in accordance with the scope of the appended claims.

I claim:

1. A cystometer system for insufflating a gas into the human body, comprising: a reservoir comprising a chamber including a movable wall whose position, at least in part, determines the volume of the chamber, the movement of said movable wall changing the said volume; biasing means exerting force on the said wall, tending to diminish said volume in opposition to fluid pressure in the chamber; a supply conduit opening into said chamber on the side of said wall to which application of gas under pressure tends to enlarge the chamber; a pressure relief valve in fluid communication with said chamber and discharging to atmosphere whereby to limit the maximum fluid pressure which can be imposed in the chamber; a first selector valve having a first, a second, and a third port, the supply conduit being connected to the said first port; a charging conduit connected to said second port and adapted to be connected to a source of gas under pressure; and an outfeed conduit connected to said third port, said first selector valve being so disposed and arranged as to only interconnect the first port to the second port or to the third port.

2. A cystometer system according to claim 1 in which the outfeed conduit includes flow control means, whereby the rate of flow of gas from the chamber is selectible.

3. A cystometer system according to claim 2 in which said flow control means comprises an orifice and a second selector valve so disposed and arranged as selectively to connect or disconnect said orifice in the outfeed line.

4. A cystometer system according to claim 1 in which the outfeed conduit discharges through flow control means whereby the rate of flow of gas from the chamber is adjustable.

5. A cystometer system according to claim 1 in which the reservoir comprises a cylinder, and the movable wall comprises a piston movable in said cylinder, and fluid sealing means between said piston and cylinder, the chamber being bounded at least in part by the cylinder and the piston.

6. A cystometer system according to claim 1 in which a pressure sensor is connected to said outfeed conduit responsive to pressure therein so as to produce a signal proportional to pressure therein, and in which readout means is connected to said pressure sensor to receive said signal and to provide a readout of the magnitude of said signal.

7. A cystometer system according to claim 1 in which the biasing means is a spring.

8. A cystometer system according to claim 5 in which the biasing means is a spring.

9. A cystometer system according to claim 8 in which a pressure sensor is connected to said outfeed conduit responsive to pressure therein so as to produce a signal proportional to pressure therein, and in which readout means is connected to said pressure sensor to receive said signal and to provide a readout of the magnitude of said signal.

10. A cystometer system according to claim 9 in which said readout means is a gauge or a recording chart.

11. A cystometer system according to claim 1 in which measurement means is provided to measure the quantity of gas expelled from the chamber.

12. A cystometer system according to claim 5 in which measuring means is provided for measuring gas in the chamber comprising a first element connected to the piston and a second element connected to the cylinder, one of said elements being a scale.

13. A cystometer system for insufflating a gas into the human body, comprising: a reservoir comprising a chamber including a movable wall whose position, at least in part, determines the volume of the chamber, the movement of said movable wall changing the said volume; biasing means exerting force on the said wall, tending to diminish said volume in opposition to fluid pressure in the chamber; a supply conduit opening into said chamber on the side of said wall to which application of gas under pressure tends to enlarge the chamber; a pressure relief valve in fluid communication with said chamber and discharging to atmosphere whereby to limit the maximum fluid pressure which can be imposed in the chamber; a first selector valve having a first, a second, and a third port, the supply conduit being connected to the said first port; a charging conduit connected to said second port and adapted to be connected to a source of gas under pressure; an outfeed conduit connected to said third port, said first selector valve being so disposed and arranged as to only interconnect the first port to the second port or to the third port; and a pressure sensor connected to said outfeed conduit responsive to pressure therein so as to produce a signal proportional to pressure therein; readout means connected to said pressure sensor to receive said signal and to provide a readout of the magnitude of said signal, said pressure sensor comprising a body having a cavity, a flexible, elastic diaphragm extending across and closing said cavity, the diaphragm having a movable portion which is movable along an axis of movement as a consequence of changes of fluid pressure in the cavity, a signal pressure inlet entering said cavity, occlusion means having an opaque section with an edge, said occlusion means being attached to said movable portion of the diaphragm so as to move axially therewith, a fiber optic light source and a fiber optic light receiver, both said light source and light receiver comprising a bundle of aligned light-transmissive fibers, both having a terminal, light-transmissive face, and both having an axis of light transmission, said axes of light transmission being aligned with one another, each said face being transverse to said last-named axes, and the occlusion means being so disposed and arranged that its edge is movable laterally of the said last-named axes so as to occlude a variable proportion of the light transmitted from one face to the other as a function of pressure in the cavity, and light-responsive sensor means in light-receiving relationship to the light receiver to provide a signal proportional to the light received by the light receiver.

14. A cystometer system according to claim 13 in which the outfeed conduit discharges through flow control means whereby the rate of flow of gas from the chamber is adjustable.

15. A cystometer system according to claim 13 in which the reservoir comprises a cylinder, and the movable wall comprises a piston movable in said cylinder, and fluid sealing means between said piston and cylinder, the chamber being bounded at least in part by the cylinder and the piston.

16. A cystometer system according to the claim 13 in which the said bundles are circular in cross-section.

17. A cystometer system according to claim 13 in which the outfeed conduit includes flow control means, whereby the rate of flow of gas from the chamber is selectible.

18. A cystometer system according to claim 13 in which said readout means is a gauge or a recording chart.

19. A cystometer system according to claim 13 in which the diaphragm comprises silicone elastomer.

* * * * *